(12) United States Patent
Choi et al.

(10) Patent No.: US 6,971,603 B2
(45) Date of Patent: Dec. 6, 2005

(54) REEL BRAKE ASSEMBLY FOR A MAGNETIC RECORDING/READING APPARATUS

(75) Inventors: Do-young Choi, Suwon (KR); Byeng-bae Park, Ansan (KR); Jun-young Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 12 days.

(21) Appl. No.: 10/678,070

(22) Filed: Oct. 6, 2003

(65) Prior Publication Data
US 2004/0069889 A1 Apr. 15, 2004

(30) Foreign Application Priority Data
Oct. 12, 2002 (KR) ................... 10-2002-0062299

(51) Int. Cl.$^7$ ............................................. G11B 15/00
(52) U.S. Cl. .................................... 242/338.1
(58) Field of Search ................. 242/338.1, 338.2, 242/338.3, 355, 355.1; 360/96.4

(56) References Cited

U.S. PATENT DOCUMENTS

| | | | |
|---|---|---|---|
| 4,807,061 A | * | 2/1989 | Yoon |
| 5,195,697 A | * | 3/1993 | Ikeda |
| 5,398,882 A | * | 3/1995 | Kim |
| 5,459,626 A | * | 10/1995 | Lee et al. |
| 5,465,921 A | * | 11/1995 | Cheon |
| 5,485,324 A | * | 1/1996 | Do et al. |
| 5,535,957 A | * | 7/1996 | Shin |

* cited by examiner

*Primary Examiner*—William A. Rivera
(74) *Attorney, Agent, or Firm*—Roylance, Abrams, Berdo & Goodman, L.L.P.

(57) ABSTRACT

A reel brake assembly for a magnetic recording/reading apparatus comprises a sub-deck slidably disposed on a main-deck in which a head drum is mounted, a reel table rotatably disposed in the sub-deck, for selectively driving a tape reel of a tape cassette, a brake unit pivotably disposed on the sub-deck, for selectively braking the reel table, and a cam gear rotated by a driving force of a driving motor, for moving the sub-deck to load and unload the sub-deck. The brake unit is selectively brought into contact with and separated from the reel table in relation to movement of the cam gear when the sub-deck is loaded and unloaded.

14 Claims, 4 Drawing Sheets

REEL BRAKE ASSEMBLY FOR A MAGNETIC RECORDING/READING APPARATUS

This application claims benefit under 35 U.S.C. §119 from Korean Patent Application No. 2002-62299, filed on Oct. 12, 2002, the entire content of which is incorporated herein by reference.

BACKGROUND OF THE INVENTION

1. Field of the Invention

The present invention relates to a magnetic recording/reading apparatus, and more particularly, to a reel brake assembly for a magnetic recording/reading apparatus to control a rotation of a reel table.

2. Description of the Related Art

A magnetic recording/reading apparatus records information on a recording medium, such as a magnetic tape, and reads the recorded information. A VCR (video cassette tape recorder) and a camcoder, for example, are types of magnetic recording/reading apparatuses.

A magnetic recording/reading apparatus comprises a main-deck on which a head drum is rotatably disposed, a sub-deck movably disposed at the main-deck to slide reciprocally, a pair of reel tables rotatably disposed on the sub-deck, for driving a tape reel of a tape cassette, and a reel brake assembly for preventing extra movement of the reel table.

The reel brake assembly prevents extra movement of the reel table that is caused by the inertia occurring when the reel table stops rotating during a stop mode, which results in some of the tape being run out or drawn in unnecessarily. As shown in FIG. 1, the reel brake assembly includes a first brake 4 and a second brake (not shown) for stopping the right and the left reel tables. The first brake 4 corresponding to the left side reel table, that is, the reel table adjacent to a supply side, operates in relation to the horizontal movement of a main-slider 2 along the main-deck 1. That is, the main-slider 2 is rotated by a driving force transmitted from a driving motor, and horizontally moves in association with a cam gear 3 for loading and unloading the sub-deck. When the sub-deck is loaded, the main-slider 2 moves to the left to contact and push contact pins 4a and 4b of the first brake 4. Then, as the first brake 4 is pushed by the main-slider 2 and separated from the reel table, a play condition in which the tape is released from the tape cassette is started.

When the sub-deck is unloaded, the main-slider 2 moves to the right, and the first brake 4 returns to the original position to come into contact with the reel tables, thereby restraining the rotation of the reel tables.

In order to drive the brake assembly, the main-slider 2 has to be extended enough to the left, that is, to an extent so that it can contact the first brake 4. Therefore, the main-slider 2 occupies a space as large as that occupied by the extended length and requires more fabrication material, resulting in an increased cost. However, in consideration of the growing demand for recording/reading apparatuses that are compact and lightweight, it is desirable for the main-slider 2 to have a shortened length and width.

SUMMARY OF THE INVENTION

The present invention has been developed in order to solve the above and other problems associated with the conventional apparatus. Accordingly, an object of the present invention is to provide a reel brake assembly for a recording/reading apparatus having an improved simplified structure and operation.

The above and other objects are substantially achieved by providing a reel brake assembly for a magnetic recording/reading apparatus comprising a sub-deck slidably disposed on a main-deck in which a head drum is mounted, a reel table rotatably disposed in the sub-deck, for selectively driving a tape reel of a tape cassette, a brake unit pivotably disposed on the sub-deck, for selectively braking the reel table, and a cam gear rotated by a driving force of a driving motor, for moving the sub-deck to load and unload the sub-deck. Specifically, the brake unit is selectively brought into contact with and separated from the reel table in relation to movement of the cam gear when the sub-deck is loaded and unloaded.

Preferably, the brake unit includes a first brake rotatably disposed in the sub-deck and adapted to contact and become separated from the reel table, a spring for compressing the first brake so that the first brake comes into contact with the reel table, and a second brake disposed coaxially with respect to the first brake, for pivoting with the first brake in a direction for separating the first brake from the reel table, and independently rotating in the reverse direction in contact with the reel table. The brake unit further includes a torsion spring for compressing the second brake so that the second brake comes into contact with the reel table.

Also, it is preferable that the first and the second brakes have first and second guide pins protruding from the respective lower portions thereof, for being guided in contact with the cam gear.

Furthermore, the cam gear can preferably have a guide groove formed in a rotation direction of the cam gear, for guiding the first and the second guide pins sequentially.

In addition, the cam gear can preferable have a guide grove formed in an upper portion thereof in a rotation direction, for guiding the brake unit.

It is also preferable for the brake unit to be guided along the guide groove with the loading of the sub-deck, and separated from the guide groove with the unloading of the sub-deck.

BRIEF DESCRIPTION OF THE DRAWINGS

The above object and a feature of the present invention will be more apparent by describing certain embodiments of the present invention with reference to the accompanying drawings, in which.

DETAILED DESCRIPTION OF THE PREFERRED EMBODIMENTS

A reel brake assembly for a magnetic recording/reading apparatus according to an embodiment of the present invention will now be described in greater detail with reference to the accompanying drawings.

Figure 1:
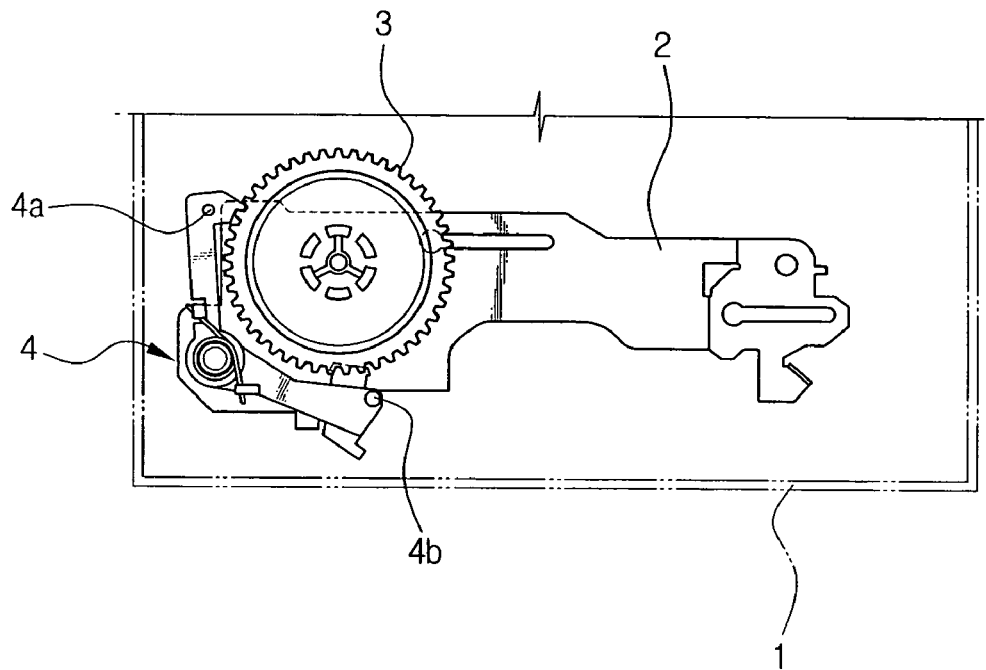
FIGS. 1 and 2 are schematic plan views showing a reel brake assembly for a conventional magnetic recording/reading apparatus.
Figure 2:
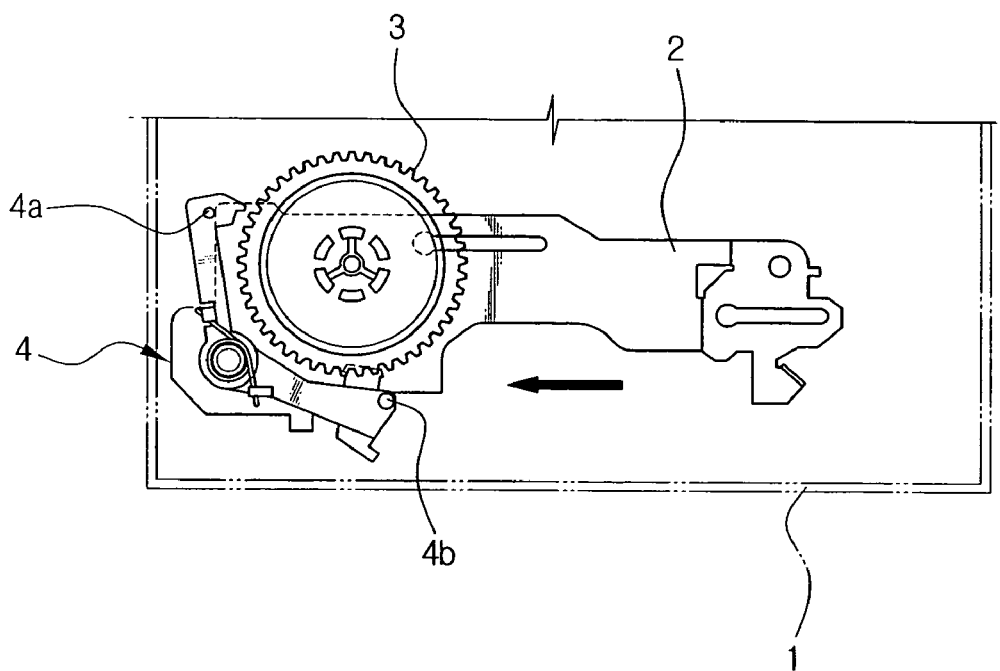
Figure 3:
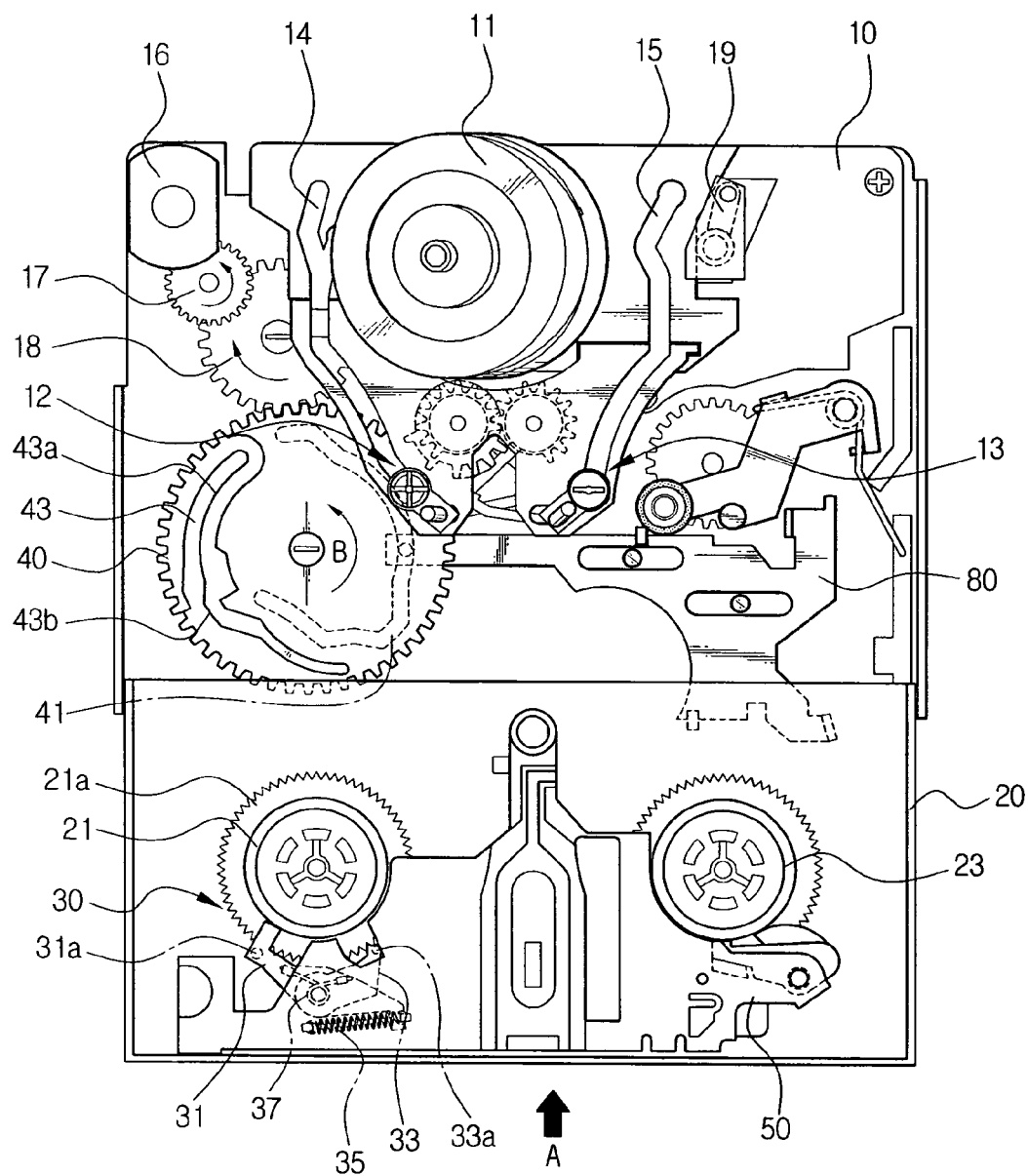
FIG. 3 is a schematic plan view showing a reel brake assembly for a magnetic recording/reading apparatus according to an embodiment of the present invention.
Figure 4:
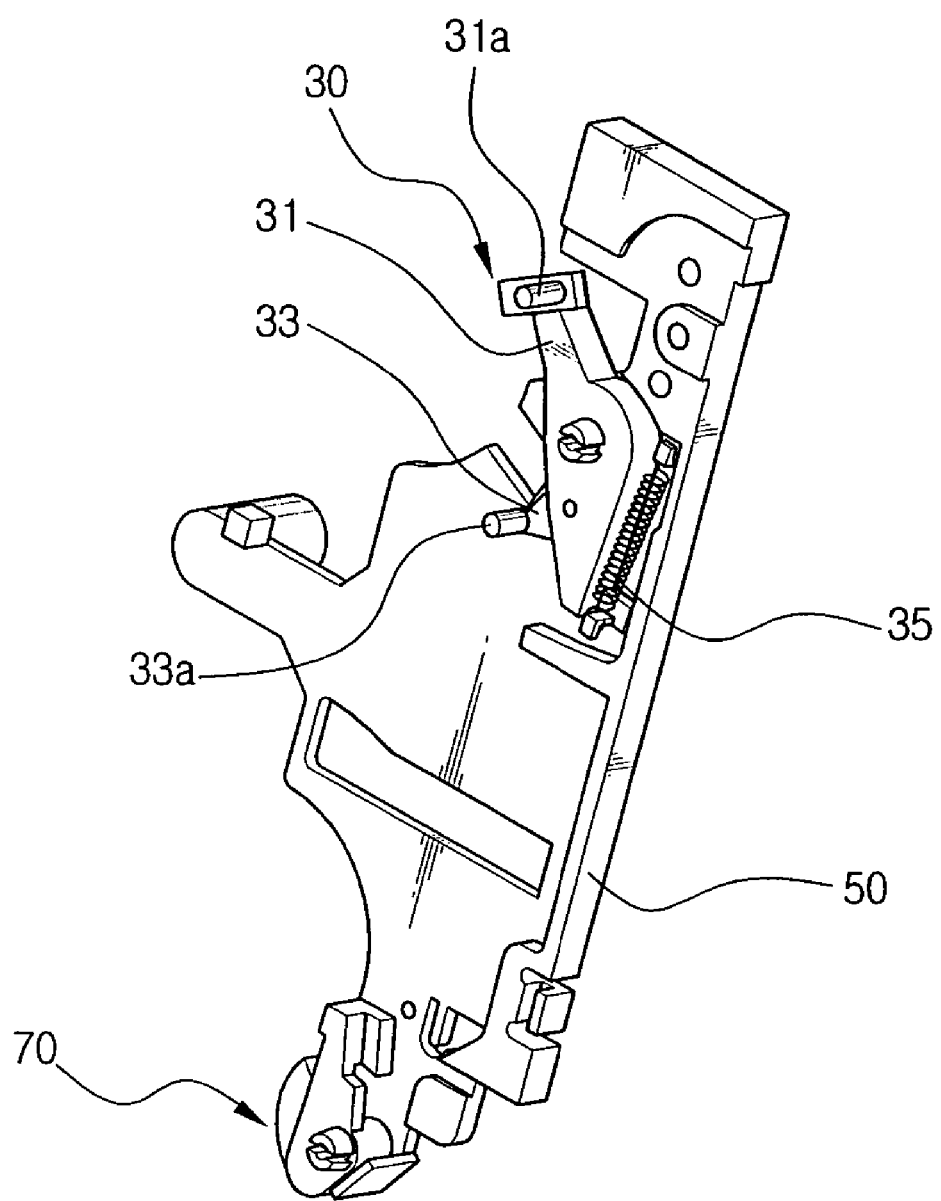
FIG. 4 is a perspective view of the brake unit of the reel brake assembly shown in FIG. 3.
Figure 5:
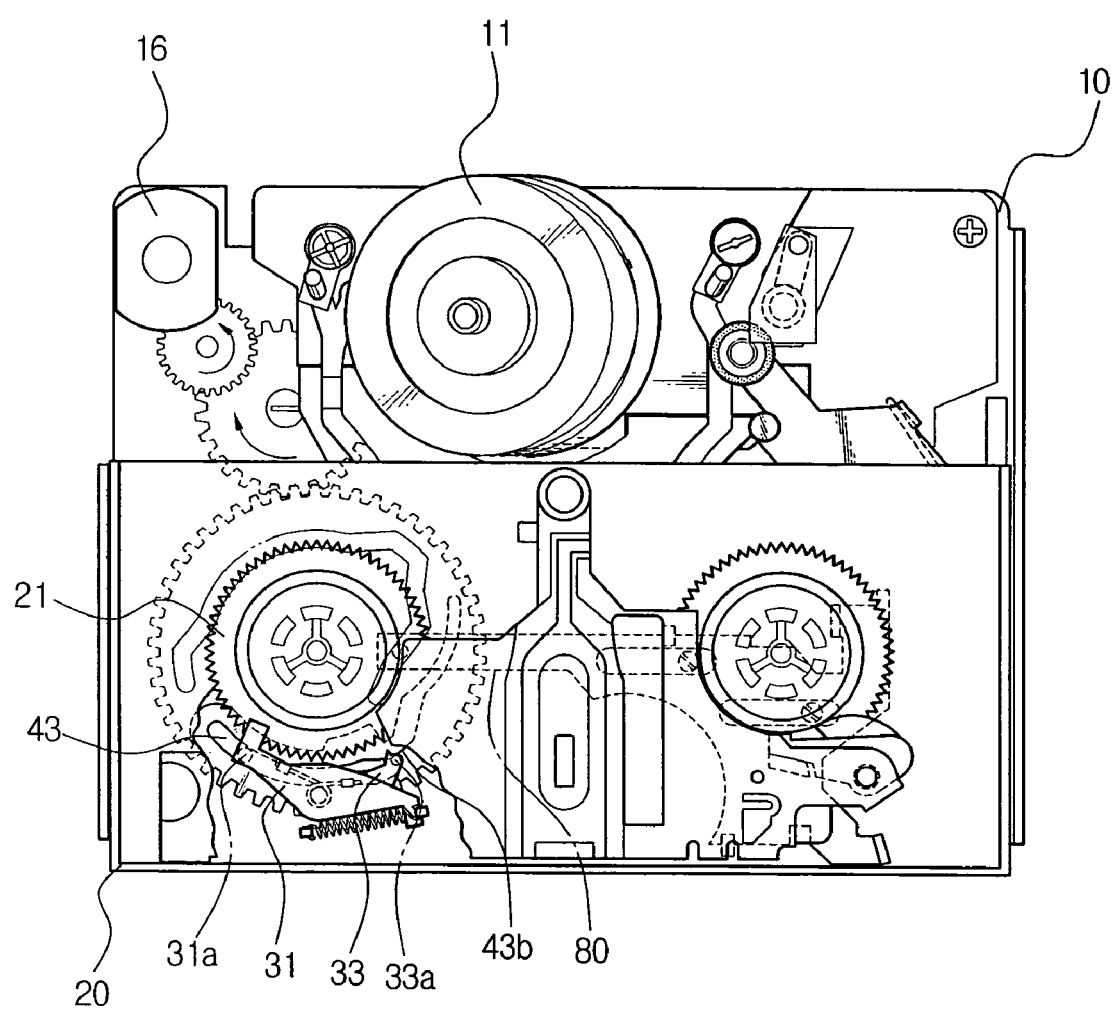
FIG. 5 is another schematic plan view showing reel brake assembly for a magnetic recording/reading apparatus according to an embodiment of the present invention.

FIGS. 3 and 5 are schematic plan views showing a magnetic recording/reading apparatus employing a reel brake assembly according to an embodiment of the present invention, while FIG. 4 is a perspective view of the brake unit of the reel brake assembly.

Referring to FIG. 3, a reel brake assembly for a magnetic recording/reading apparatus includes a main-deck 10 on which a head drum 11 is disposed, a sub-deck 20 slidably disposed at the main-deck 10, a pair of reel tables 21 and 23 for driving a tape cassette on the sub-deck 20, a brake unit 30, and a cam gear 40. It is noted that FIG. 3 shows an unloaded state of the sub-deck 20.

The main-deck 10 is provided with a pair of pole base units 12 and 13 for guiding the tape to the right and the left of the head drum 11 so that the tape is wound around the head drum 11 as it runs. The pole base units 12 and 13 respectively reciprocate along guide rails 14 and 15 provided on the main-deck 10 in relation to movement of the cam gear 40. The main-deck 10 may be provided with a plurality of guide poles (not shown) for guiding a running of the tape on the main-deck.

Also, the main-deck 10 is provided with a driving motor 16 for supplying a driving force to reciprocate the pole base units 12 and 13, and thus load and unload the sub-deck 20. The driving force of the driving motor 16 is transmitted to the cam gear 40 via a plurality of driving force transmitting gears 17 and 18.

The sub-deck 20 is loaded on the main-deck 10 in a direction of A in association with a rotation of the cam gear 40, or is unloaded in the reverse direction. The sub-deck 20 is provided with the pair of reel tables 21 and 23 for driving tape reels of the tape cassette. The reel table 21 at the left operates to supply a wound tape, and is called a supply reel. The reel table 23 at the right operates to wind the tape supplied from the supply reel, and is called a take up reel. The reel tables 21 and 23 are driven by a driving force transmitted from a capstan motor 19 disposed in the main-deck 10.

The brake unit 30 is pivotably disposed on the sub-deck 20, for selectively controlling a rotation of the reel table 21. The brake unit 30 includes a first brake 31, a second brake 33, a coil spring 35, and a torsion spring 37. The sub brake unit 30 in this embodiment is supported by a reel cover 50 disposed at an upper portion of the sub-deck 20 and is shown in perspective in FIG. 4. That is, the first brake 31 is pivotably disposed at the reel cover 50 with one end thereof contacting with, and separating from the reel table 21 as the first brake 31 pivots. The coil spring 35 is connected with the other end of the first brake 31 and the reel cover 50, and compresses the first brake 31 so that the first brake 31 comes into contact with the reel table 21. The second brake 33 is disposed coaxially with the first brake 31 and pivots to selectively contact or become separated from the gear teeth 21a of the reel table 21. A torsion spring 37 is disposed between the second brake 33 and the first brake 31. The torsion spring 37 elastically compress the second brake 33 so that the second brake 33 comes into contact with the gear teeth 21a of the reel table 21. The reel cover 50 is further provided with a brake unit 70 for controlling a rotation of the other reel table 23. A more detailed description of the brake unit 70 is omitted because the brake unit 70 can be a general brake assembly operating with a main-slider 80.

As will now be described, the brake unit 30 operates in association with the cam gear 40. The first and the second brakes 31 and 33 have first and second guide pins 31a and 33a, respectively, protruding from each lower portion thereof. Also, the sub-deck 20 has guide holes (not shown) formed therein for permitting the first and the second guide pins 31a and 33a to pass therethrough.

The cam gear 40 is rotatably disposed in the main-deck 10. The cam gear 40 is rotated by the driving force transmitted from the driving motor 16, and has gear teeth reciprocating the pole base units 12 and 13. Also, the cam gear 40 has a guide groove 41 of a predetermined shape that is formed in a lower portion thereof, for guiding the main-slider 80 to horizontally reciprocate on the main-deck 10.

Also, the cam gear 40 has another guide groove 43 disposed in an upper portion thereof, for moving the brake unit 30. Another guide groove 43 is extended by a predetermined length in a circumference direction of the cam gear 40, varying in length from a rotation center of the cam gear 40.

Into another guide groove 43 is inserted the first and the second guide pins 31a and 33a. The first and the second guide pins 31a and 33a are cam-guided to move the first and the second brakes 31 and 33. That is, when the cam gear 40 rotates to load the sub-deck 20 in the direction of A, the first and the second guide pins 31a and 33a are smoothly guided over another guide groove 43, and the sub-deck 20 moves into the position as shown in FIG. 5.

Another guide groove 43 has a first guide portion 43a of a curvature shape for guiding the first guide pin 31 a and a second guide portion 43b protruding from the first guide portion 43a outwardly from the rotation center of the cam gear 40. The second guide portion 43b guides and moves the second guide pin 31b.

An example of the operation of the reel brake assembly of the magnetic recording/reading apparatus according to an embodiment of the present invention will now be described.

When a tape cassette (not shown) is mounted in the sub-deck 20 in the state of FIG. 3, the sub-deck 20 is loaded in the direction of A by the driving of the driving motor 16. At this time, the first and the second brakes 31 and 33 come into contact with the reel table 21. The cam gear 40 rotates in the direction of B, thereby loading the sub-deck 20 and moving the pole base units 12 and 13, simultaneously.

When the sub-deck 20 is completely loaded as shown in FIG. 4, the cam gear 40 independently rotates at a predetermined angle. At this point, the pole base units 12 and 13 are moved to the right and the left of the head drum 11 to support the tape. The main slider 80 is guided by another guide groove 41 of the cam gear 40 to move to the left.

When the sub-deck 20 is completely moved in the direction A, the guide pins 31a and 33a of the first and the second brakes 31 and 33 are placed in the upper portion of another guide grove 43 of the cam gear 40.

In this state, when the cam gear 40 is rotated in the direction B, the first guide pin 31a is guided to the first guide portion 43a to pivot the first brake 31. Also, the second guide pin 33a is guided to the second guide portion 43b to pivot the second brake 33. That is, the first and the second brakes 31 and 33 are separated from the reel table 21. Accordingly, the reel table 21 freely rotates to thus be driven by the capstan motor 19.

Meanwhile, when the sub-deck 20 is unloaded, the cam gear 40 rotates in the direction that is reverse to that when the sub-deck 20 is loaded. Accordingly, the first and the second guide pins 31a and 33a are separated from another guide groove 43 such that the first and the second brakes 31 and 33 come into contact with the reel table 21 again. The sub-deck 20 thus returns from the state shown in FIG. 5 to the state as shown in FIG. 3.

As described above, the brake unit 30 is operated in association with the rotation of the cam gear 40. Moving the main slider 80 to the left to operate the brake unit, as in the conventional apparatus, is not required and thus, the length of the main-slider 80 can be shortened. A plan area of the main-slider 80 and fabrication material can be reduced and thus, the size can be reduced.

Although the brake unit 30 is supported by the reel cover 50 in this embodiment by way of an example, this should not be considered the only configuration. That is, in another embodiment, the brake unit 30 is disposed in the upper portion of the sub-deck 20, but may be directly supported by the sub-deck 20 or the reel cover 50.

According to the reel brake assembly of the embodiments of the magnetic recording/reading apparatus of the present invention described above, the reel brake operates in association with the rotation of the cam gear.

Since it is not required to operate the reel brake using the main-slider, the structure and the main-slider can be simplified.

although certain embodiments of the present invention have been described, it will be understood by those skilled in the art that the present invention should not be limited to the described embodiments, but various changes and modifications can be made within the spirit and scope of the present invention as defined by the appended claims.

What is claimed is:

1. A reel brake assembly for a magnetic recording/reading apparatus, comprising:
   a sub-deck slidably disposed on a main-deck in which a head drum is mounted;
   a reel table, rotatably disposed in the sub-deck, and adapted to selectively drive a tape reel of a tape cassette;
   a brake unit, pivotably disposed on the sub-deck, and adapted to selectively brake the reel table, the brake unit includes
      a first brake rotatably disposed in the sub-deck and adapted to contact and become separated from the reel table;
      a spring, adapted to compress the first brake so that the first brake comes into contact with the reel table; and
      a second brake, disposed coaxially with respect to the first brake, and which is adapted to pivot with the first brake in a direction to separate the first brake from the reel table, and adapted to independently rotate in the reverse direction in contact with the reel table; and
   a cam gear, adapted to be rotated by a driving force of a driving motor, to move the sub-deck to load and unload the sub-deck, such that the brake unit is selectively brought into contact with and separated from the reel table in relation to movement of the cam gear when the sub-deck is loaded and unloaded.

2. A reel brake assembly as claimed in claim 1, wherein the brake unit further includes a torsion spring, adapted to apply a force to the
second brake so that the second brake comes into contact with the reel table.

3. A reel brake assembly as claimed in claim 2, wherein the torsion spring is adapted to apply the force to the second brake so that the second brake comes into contact with a gear portion of the reel table.

4. A reel brake assembly as claimed in claim 1, wherein the first and the second brakes have first and second guide pins, respectively, protruding from the respective lower portions thereof, which are adapted to be guided in contact with the cam gear.

5. A reel brake assembly as claimed in claim 4, wherein the cam gear has a guide groove formed in a rotation direction of the cam gear, which is adapted to guide the first and the second guide pins sequentially.

6. A reel brake assembly as claimed in claim 1, wherein the cam gear has a guide grove, formed in an upper portion thereof in a rotation direction of the cam gear, which is adapted to guide the brake unit.

7. A reel brake assembly as claimed in claim 6, wherein the brake unit is adapted to be guided along the guide groove with the loading of the sub-deck, and separated from the guide groove with the unloading of the sub-deck.

8. A reel brake assembly for a magnetic recording/reading apparatus, the magnetic recording/reading apparatus comprising a sub-deck slidably disposed on a main-deck in which a head drum is mounted, a reel table, rotatably disposed in the sub-deck, and adapted to selectively drive a tape reel of a tape cassette, and a cam gear, adapted to be rotated by a driving force of a driving motor, to move the sub-deck to load and unload the sub-deck, the reel brake assembly comprising:
   a brake unit, pivotably disposed on the sub-deck, and adapted to selectively brake the reel table, such that the brake unit is selectively brought into contact with and separated from the reel table in relation to movement of the cam gear when the sub-deck is loaded and unloaded, the brake unit including
      a first brake rotatably disposed in the sub-deck and adapted to contact and become separated from the reel table;
      a spring, adapted to compress the first brake so that the first brake comes into contact with the reel table; and
      a second brake, disposed coaxially with respect to the first brake, and which is adapted to pivot with the first brake in a direction to separate the first brake from the reel table, and adapted to independently rotate in the reverse direction in contact with the reel table.

9. A reel brake assembly as claimed in claim 8, wherein the brake unit further includes a torsion spring, adapted to apply a force to the second brake so that the second brake comes into contact with the reel table.

10. A reel brake assembly as claimed in claim 9, wherein the torsion spring is adapted to apply the force to the second brake so that the second brake comes into contact with a gear portion of the reel table.

11. A reel brake assembly as claimed in claim 8, wherein the first and the second brakes have first and second guide pins, respectively, protruding from the respective lower portions thereof, which are adapted to be guided in contact with the cam gear.

12. A reel brake assembly as claimed in claim 11, wherein the cam gear has a guide groove formed in a rotation direction of the cam gear, which is adapted to guide the first and the second guide pins sequentially.

13. A reel brake assembly as claimed in claim 8, wherein the cam gear has a guide grove, formed in an upper portion thereof in a rotation direction of the cam gear, which is adapted to guide the brake unit.

14. A reel brake assembly as claimed in claim 13, wherein the brake unit is adapted to be guided along the guide groove with the loading of the sub-deck, and separated from the guide groove with the unloading of the sub-deck.

* * * * *